(12) United States Patent
Murakami

(10) Patent No.: US 10,477,657 B2
(45) Date of Patent: Nov. 12, 2019

(54) ILLUMINATION SYSTEM, ILLUMINATION SETTING METHOD, AND RECORDING MEDIUM

(71) Applicant: Panasonic Intellectual Property Management Co., Ltd., Osaka (JP)

(72) Inventor: Tadashi Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/255,127

(22) Filed: Jan. 23, 2019

(65) Prior Publication Data

US 2019/0254147 A1 Aug. 15, 2019

(30) Foreign Application Priority Data

Feb. 14, 2018 (JP) .................................. 2018-024368

(51) Int. Cl.
*H05B 37/02* (2006.01)
*H04W 4/06* (2009.01)
(Continued)

(52) U.S. Cl.
CPC ....... *H05B 37/0272* (2013.01); *H04B 17/318* (2015.01); *H04L 41/0866* (2013.01); *G06F 3/0488* (2013.01)

(58) Field of Classification Search
CPC . H05B 37/0272; H05B 37/02; H04L 41/0866; H04L 12/24; H04B 17/318; G06F 3/0488; H04W 52/34; H04W 4/06; H04W 4/00; H04W 16/28; H04W 76/02; H04W 4/04
See application file for complete search history.

(56) References Cited

U.S. PATENT DOCUMENTS 1,037,950 A * 9/1912 Maxwell ................ B65H 75/08
242/597.3
8,742,694 B2 * 6/2014 Bora ................... H05B 33/0863
315/307
(Continued)

FOREIGN PATENT DOCUMENTS

JP 2013-258048 A 12/2013
JP 2016-091637 A 5/2016
(Continued)

*Primary Examiner* — Pablo N Tran

(74) *Attorney, Agent, or Firm* — McDermott Will & Emery LLP

(57) ABSTRACT

An illumination system includes a plurality of lighting fixtures, a plurality of slave devices, and an information communication terminal. Each of the plurality of slave devices includes: first wireless communication circuitry configured to receive, from each of the plurality of lighting fixtures, a signal including a MAC address of the lighting fixture, and to measure a received signal strength indication (RSSI) of the signal received; and a first controller that causes the first wireless communication circuitry to transmit the MAC address and RSSI information indicating the RSSI measured. The information communication terminal includes a second controller that makes associations between positions and MAC addresses of the plurality of lighting fixtures based on the RSSI information and position information stored in a storage.

17 Claims, 11 Drawing Sheets

(51) Int. Cl.
*H04W 52/34* (2009.01)
*H04L 12/24* (2006.01)
*H04B 17/318* (2015.01)
*G06F 3/0488* (2013.01)

(56) References Cited

U.S. PATENT DOCUMENTS

| | | | | |
|---|---|---|---|---|
| 9,167,408 | B2 * | 10/2015 | Bucci | G08C 17/02 |
| 9,441,979 | B2 * | 9/2016 | Barnard | H05B 37/0272 |
| 9,832,845 | B2 * | 11/2017 | Cho | H05B 37/0272 |
| 9,974,150 | B2 * | 5/2018 | Oliver | H05B 37/0272 |
| 10,349,496 | B2 * | 7/2019 | Wang | H05B 33/0845 |
| 2008/0218087 | A1 * | 9/2008 | Crouse | H05B 37/0245 |
| | | | | 315/131 |
| 2013/0329423 | A1 | 12/2013 | Kusakari | |
| 2017/0164455 | A1 | 6/2017 | Ando | |
| 2017/0231068 | A1 | 8/2017 | Nishioka et al. | |
| 2018/0063927 | A1 * | 3/2018 | Abraham | H05B 37/0272 |
| 2018/0103411 | A1 * | 4/2018 | Greene | H04W 40/22 |
| 2019/0146639 | A1 * | 5/2019 | Sarode | G06F 3/0482 |
| | | | | 715/764 |

FOREIGN PATENT DOCUMENTS

| | | | |
|---|---|---|---|
| JP | 2017-010852 | A | 1/2017 |
| JP | 2017-107669 | A | 6/2017 |
| JP | 2017-143418 | A | 8/2017 |

* cited by examiner

FIG. 4

| NUMBER | COORDINATES | | DISTANCE FROM EACH SLAVE DEVICE | | | |
|---|---|---|---|---|---|---|
| TEMPORARY ADDRESS | X | Y | La | Lb | Lc | Ld |
| SLAVE DEVICE A | 0.0 | 0.0 | – | 4.0 | 8.0 | 8.9 |
| SLAVE DEVICE B | 0.0 | 4.0 | 4.0 | – | 8.9 | 8.0 |
| SLAVE DEVICE C | 8.0 | 0.0 | 8.0 | 8.9 | – | 4.0 |
| SLAVE DEVICE D | 8.0 | 4.0 | 8.9 | 8.9 | 8.0 | – |
| LIGHTING FIXTURE 1 | -3.0 | 5.0 | 5.8 | 3.2 | 12.1 | 11.0 |
| LIGHTING FIXTURE 2 | -3.0 | 3.0 | 4.2 | 3.2 | 11.4 | 11.0 |
| LIGHTING FIXTURE 3 | -3.0 | 1.0 | 3.2 | 4.2 | 11.0 | 11.4 |
| LIGHTING FIXTURE 4 | -3.0 | -1.0 | 3.2 | 5.8 | 11.0 | 12.1 |
| . | . | . | . | . | . | . |
| . | . | . | . | . | . | . |
| . | . | . | . | . | . | . |
| LIGHTING FIXTURE N-1 | 11.0 | 1.0 | 11.0 | 11.4 | 3.2 | 4.2 |
| LIGHTING FIXTURE N | 11.0 | -1.0 | 11.0 | 12.1 | 3.2 | 5.8 |

| NUMBER | MAC ADDRESS | DISTANCE TO EACH SLAVE DEVICE | | | |
|---|---|---|---|---|---|
| | | La | Lb | Lc | Ld |
| | Xxxxxxx0004 | 11.0 | 11.4 | 3.2 | 4.2 |
| | Xxxxxxx0009 | 3.2 | 5.8 | 11.0 | 11.4 |
| | Xxxxxxx0123 | 11.0 | 12.1 | 3.2 | 5.8 |
| | Xxxxxxx0235 | 4.2 | 3.2 | 11.0 | 11.4 |
| | · | · | · | · | · |
| | · | · | · | · | · |
| | · | · | · | · | · |
| | · | · | · | · | · |
| | · | · | · | · | · |
| | Xxxxxxx0042 | 3.2 | 5.8 | 11.0 | 12.1 |
| | Xxxxxxx0051 | 5.8 | 3.2 | 11.4 | 11.0 |

| NUMBER | TEMPORARY ADDRESS |
|---|---|
| N-1 | LIGHTING FIXTURE 3 |
| N | LIGHTING FIXTURE 2 |
| · | · |
| · | · |
| · | · |
| · | · |
| · | · |
| · | · |
| · | · |
| | LIGHTING FIXTURE 4 |
| | LIGHTING FIXTURE 1 |

ILLUMINATION SYSTEM, ILLUMINATION SETTING METHOD, AND RECORDING MEDIUM

CROSS REFERENCE TO RELATED APPLICATION

This application claims the benefit of priority of Japanese Patent Application Number 2018-024368 filed on Feb. 14, 2018, the entire content of which is hereby incorporated by reference.

BACKGROUND

1. Technical Field

The present disclosure relates to an illumination system, an illumination setting method, and a recording medium.

2. Description of the Related Art

An illumination system that controls a plurality of lighting fixtures in groups is known. Japanese Unexamined Patent Application Publication No. 2017-10852 discloses an illumination system capable of efficiently configuring a setting such as grouping.

SUMMARY

In order for an illumination controller to control a plurality of lighting fixtures, identification information of the plurality of lighting fixtures is required. The identification information is entered by, for example, an installer of the plurality of lighting fixtures, which is a troublesome task when the number of lighting fixtures is large.

The present disclosure provides an illumination system, an illumination setting method, and a recording medium that can easily make associations between positions and identification information of a plurality of lighting fixtures.

An illumination system according to an aspect of the present disclosure is an illumination system including a plurality of lighting fixtures, a plurality of illumination controllers, and an information communication terminal. Each of the plurality of illumination controllers includes: first wireless communication circuitry configured to receive, from each of the plurality of lighting fixtures, a signal including identification information of the lighting fixture, and to measure a received signal strength indication (RSSI) of the signal received; and a first controller that causes the first wireless communication circuitry to transmit the identification information and RSSI information indicating the RSSI measured by the first wireless communication circuitry. The information communication terminal includes: second wireless communication circuitry configured to receive the RSSI information and the identification information, transmitted from each of the plurality of illumination controllers; and a second controller that (i) based on the RSSI information and position information indicating a positional relationship between the plurality of lighting fixtures and the plurality of illumination controllers, identifies a lighting fixture in the position information, which corresponds to a first lighting fixture among the plurality of lighting fixtures, which has a corresponding positional relationship to a given illumination controller among the plurality of illumination controllers, and (ii) associates the lighting fixture identified in the position information with the identification information of the first lighting fixture.

An illumination setting method according to an aspect of the present disclosure is an illumination setting method for use in an illumination system including a plurality of lighting fixtures, a plurality of illumination controllers, and an information communication terminal. The illumination setting method includes: by each of the plurality of illumination controllers, receiving, from each of the plurality of lighting fixtures, a signal including identification information of the lighting fixture, and measuring a received signal strength indication (RSSI) of the signal received from each of the plurality of lighting fixtures; transmitting the identification information and RSSI information indicating the RSSI measured; by the information communication terminal, receiving the RSSI information and the identification information, transmitted from each of the plurality of illumination controllers; based on the RSSI information and position information indicating a positional relationship between the plurality of lighting fixtures and the plurality of illumination controllers, identifying a lighting fixture in the position information, which corresponds to a first lighting fixture among the plurality of lighting fixtures, which has a corresponding positional relationship to a given illumination controller among the plurality of illumination controllers; and associating the lighting fixture identified in the position information with the identification information of the first lighting fixture.

A recording medium according to an aspect of the present disclosure is a non-transitory computer-readable recording medium for use in an information communication terminal included in an illumination system including a plurality of lighting fixtures, a plurality of illumination controllers, and the information communication terminal. The recording medium has a program recorded thereon for causing the information communication terminal to execute an illumination setting method. Each of the plurality of illumination controllers: receives, from each of the plurality of lighting fixtures, a signal including identification information of the lighting fixture, and measures a received signal strength indication (RSSI) of the signal received from each of the plurality of lighting fixtures; and transmits the identification information and RSSI information indicating the RSSI measured. The illumination setting method includes: receiving the RSSI information and the identification information, transmitted from each of the plurality of illumination controllers; based on the RSSI information and position information indicating a positional relationship between the plurality of lighting fixtures and the plurality of illumination controllers, identifying a lighting fixture in the position information, which corresponds to a first lighting fixture among the plurality of lighting fixtures, which has a corresponding positional relationship to a given illumination controller among the plurality of illumination controllers; and associating the lighting fixture identified in the position information with the identification information of the first lighting fixture.

The present disclosure realizes an illumination system, an illumination setting method, and a recording medium that can easily make associations between positions and identification information of a plurality of lighting fixtures.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 4 illustrates position information stored in a storage;

DETAILED DESCRIPTION OF THE EMBODIMENTS

Hereinafter, exemplary embodiments will be described with reference to the drawings. Note that the embodiments below each describe a general or specific example. The numerical values, shapes, materials, elements, the arrangement and connection of the elements, steps, and the processing order of the steps, etc. presented in the embodiments below are mere examples and do not limit the present disclosure. Furthermore, among the structural elements in the embodiments below, those not recited in any one of the independent claims representing the most generic concepts will be described as optional structural elements.

Note also that each figure is a schematic illustration and not necessarily a precise illustration. Furthermore, throughout the figures, the same reference signs are given to essentially the same structural elements, and redundant descriptions may be omitted or simplified.

Embodiment 1

[Configuration]

Figure 1:
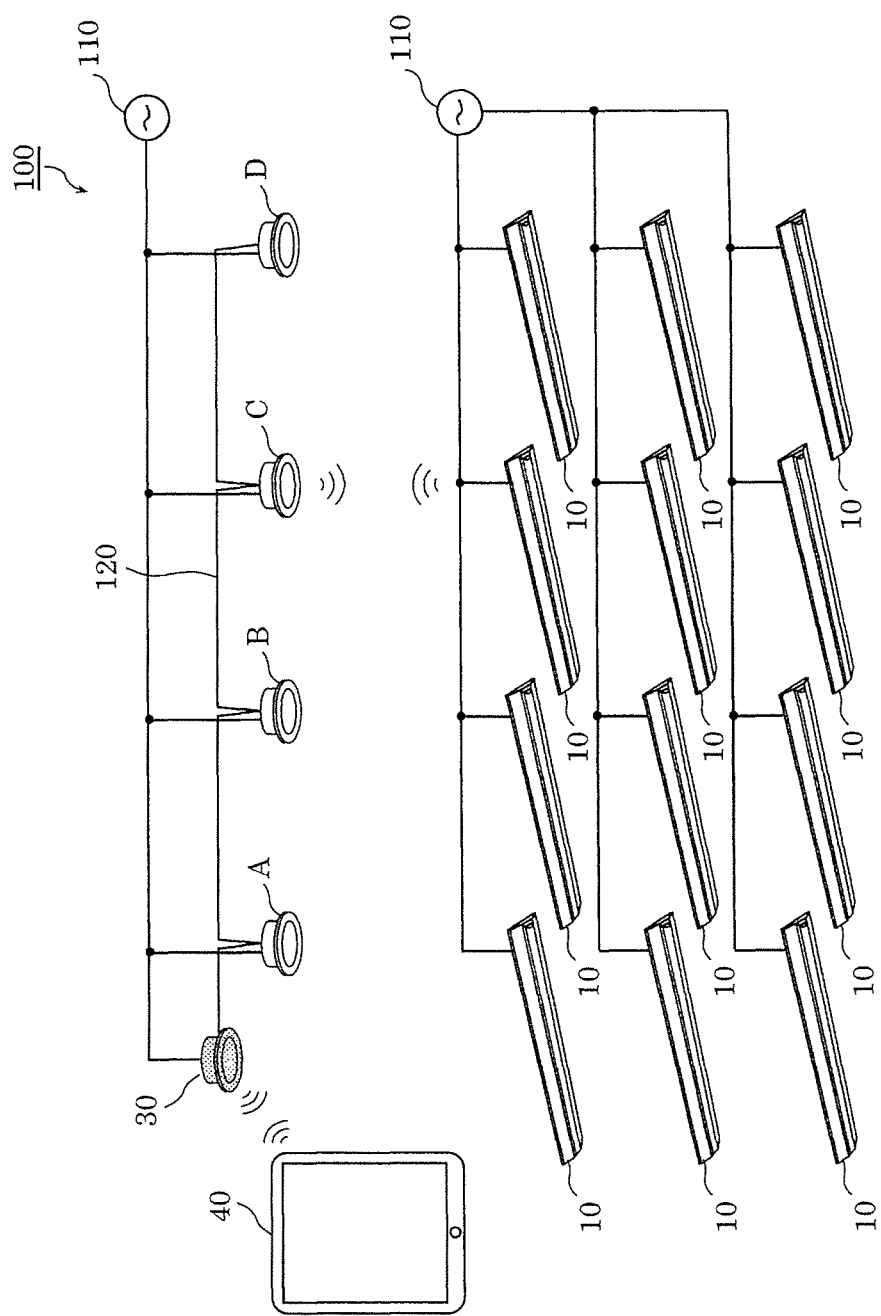
FIG. 1 is schematic diagram of an illumination system according to Embodiment 1.
Figure 2:
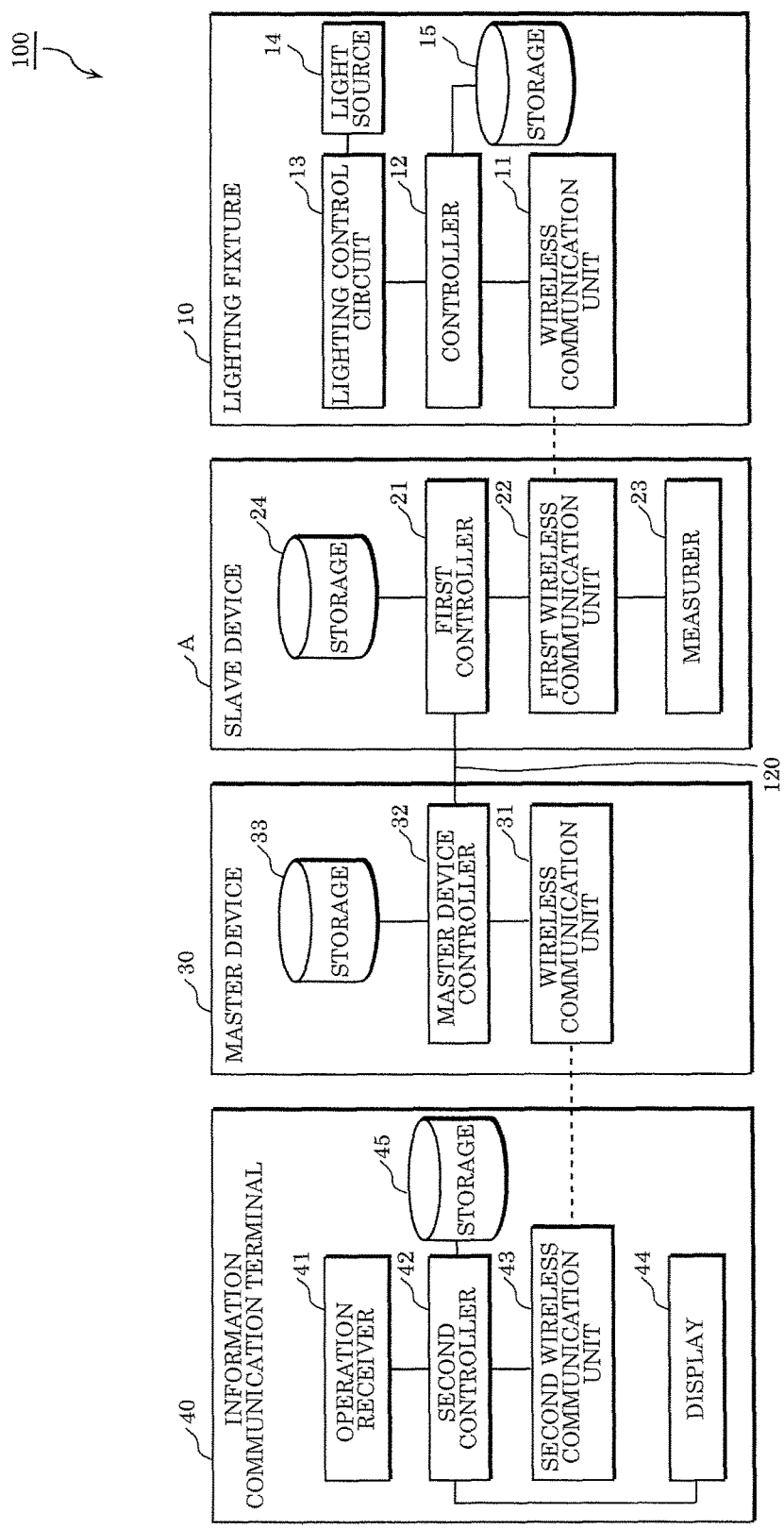
FIG. 2 is a block diagram illustrating a functional configuration of the illumination system according to Embodiment 1.

Hereinafter, a configuration of an illumination system according to Embodiment 1 will be described. FIG. 1 is schematic diagram of the illumination system according to Embodiment 1. FIG. 2 is a block diagram illustrating a functional configuration of the illumination system according to Embodiment 1.

As illustrated in FIG. 1, illumination system 100 according to Embodiment 1 includes a plurality of lighting fixtures 10, a plurality of slave devices A to D, master device 30, and information communication terminal 40. The plurality of lighting fixtures 10, the plurality of slave devices A to D, and master device 30 are supplied with alternating-current power from system power source 110. Master device 30 and each of a plurality of slave devices A to D are connected via signal line 120. Note that the number of lighting fixtures 10 in FIG. 1 is not accurate. Although FIG. 2 shows only one slave device and one lighting fixture, there are actually a plurality of slave devices A to D and a plurality of lighting fixtures 10.

In illumination system 100, each of a plurality of slave devices A to D performs lighting control on target lighting fixture 10 to be controlled by the slave device, based on a control command obtained from master device 30 via signal line 120. Here, for example, each of a plurality of slave devices A to D designates a media access control (MAC) address of target lighting fixture 10 to be controlled and transmits a command for performing lighting control on lighting fixture 10 having that MAC address. Therefore, MAC addresses of the plurality of lighting fixtures 10 need to be known in advance. The MAC addresses are, for example, entered into information communication terminal 40 by an installer of illumination system 100 at the time of installation and registered in the plurality of slave devices A to D via information communication terminal 40.

However, when the number of lighting fixtures 10 is large, it is troublesome for the installer to enter the MAC addresses of lighting fixtures 10 one by one. Moreover, when the lighting control is to be performed on the plurality of lighting fixtures 10 in groups according to areas to be illuminated, the installer needs to register the MAC addresses of lighting fixtures 10 in corresponding slave devices while taking the installation positions of lighting fixtures 10 into consideration. That is to say, associations need to be made between the installation positions and the MAC addresses of lighting fixtures 10, which is also a troublesome task.

In view of the above, illumination system 100 employs a technique for easily making associations between the installation positions and the MAC addresses of the plurality of lighting fixtures 10 (Hereinafter, this technique will also be referred to as an association operation). Hereinafter, each of the structural elements of illumination system 100 will be described in detail with reference to FIG. 1 and FIG. 2.

[Information Communication Terminal]

First, a configuration of information communication terminal 40 will be described. Information communication terminal 40 receives a user operation and transmits a control instruction signal to master device 30 according to the user operation received. Information communication terminal 40 is, for example, a mobile terminal such as a smartphone, a tablet terminal, or a personal digital assistant (PDA), but may be a stationary terminal such as a personal computer. Further, information communication terminal 40 may be a remote control dedicated to illumination system 100. Information communication terminal 40 includes operation receiver 41, second wireless communication unit 43, second controller 42, display 44, and storage 45.

Operation receiver 41 receives a user operation. Specifically, operation receiver 41 includes a touch panel, for example.

Second controller 42 causes second wireless communication unit 43 to transmit a control instruction signal according to the user operation received by operation receiver 41. Second controller 42 is realized by, for example, a microcomputer, but may be realized by a processor or a dedicated circuit. Second wireless communication unit 43 is a wireless communication circuit that allows information communication terminal 40 to wirelessly communicate with master device 30. Second wireless communication unit 43 transmits a control instruction signal to master device 30, for example.

Display 44 is a display device that displays an image based on control by second controller 42. Display 44 is realized by a liquid crystal panel or an organic electroluminescent (EL) panel, for example.

Storage 45 is a storage device that stores, for example, a control program executed by second controller 42. Storage 45 is realized by a semiconductor memory, for example.

[Master Device]

Next, a configuration of master device 30 will be described. Master device 30 transmits a control command to at least a portion of slave devices A to D based on the user operation performed on information communication terminal 40. Master device 30 may transmit a control command to at least a portion of slave devices A to D based on a user operation performed on a dedicated operation receiving device (specifically, a user interface device such as an operation panel, not illustrated) provided on, for example, a wall of a room in which illumination system 100 is installed. Master device 30 includes wireless communication unit 31, master controller 32, and storage 33.

Wireless communication unit 31 is a wireless communication circuit that allows master device 30 to wirelessly communicate with the operation receiving device or information communication terminal 40. Wireless communication unit 31 receives a control instruction signal from information communication terminal 40, for example.

Master controller 32 transmits a control command to wireless communication unit 31 based on the control instruction signal received by wireless communication unit 31. Master controller 32 is realized by, for example, a microcomputer, but may be realized by a processor or a dedicated circuit.

Storage 33 is a storage device that stores, for example, a control program executed by master controller 32. Storage 33 is realized by a semiconductor memory, for example.

[Slave Device]

Next, a configuration of slave device A will be described. Note that a detailed description of slave devices B to D will be omitted since slave devices B to D have the same configuration as slave device A. Slave device A performs lighting control on, among the plurality of lighting fixtures 10, target lighting fixture 10 to be controlled by slave device A. Slave device A is an example of the illumination controller. Slave device A includes first controller 21, first wireless communication unit 22, measurer 23, and storage 24.

First controller 21 obtains a control command from master device 30 via signal line 120, and causes first wireless communication unit 22 to transmit a command for performing lighting control based on the control command obtained. First controller 21 is realized by, for example, a microcomputer, but may be realized by a processor or a dedicated circuit.

First wireless communication unit 22 is a wireless communication circuit that allows slave device A to wirelessly communicate with the plurality of lighting fixtures 10. For example, first wireless communication unit 22 transmits a command for performing lighting control to target lighting fixture 10.

Measurer 23 measures a received signal strength indication (RSSI) of a signal received by first wireless communication unit 22 from each of the plurality of lighting fixtures 10. The RSSI is used in the association operation described later. Note that measurer 23 may be realized as a device integrated with first wireless communication unit 22.

Storage 24 is a storage device that stores, for example, a control program executed by first controller 21. The RSSI may be temporarily stored in storage 24. Storage 24 is realized by a semiconductor memory, for example.

[Lighting Fixtures]

First, lighting fixtures 10 will be described. Lighting fixtures 10 are ceiling lights that illuminate a room, and lighting control is performed on lighting fixtures 10 by corresponding slave devices. Note that the mode of lighting fixtures 10 is not limited to the mode illustrated in FIG. 1. Lighting fixtures 10 may be ceiling lights that are circular in a plan view or downlights, for example.

Each of lighting fixtures 10 includes wireless communication unit 11, controller 12, lighting control circuit 13, light source 14, and storage 15. Hereinafter, each of the structural elements of lighting fixture 10 will be described.

First wireless communication unit 11 is a wireless communication circuit that allows lighting fixture 10 to wirelessly communicate with the plurality of slave devices A to D. Wireless communication unit 11 receives a command from a corresponding slave device, for example.

Controller 12 performs lighting control on light source 14 via lighting control circuit 13 based on a command received by wireless communication unit 11. The lighting control is, for example, dimming control including turn-on and turn-off, but may be toning control if light source 14 is capable of toning. Moreover, the lighting control may be scheduled control, which is to control light source 14 based on a schedule. Controller 12 is realized by, for example, a microcomputer, but may be realized by a processor or a dedicated circuit. Lighting control circuit 13 supplies voltage and current to light source 14 based on the control by controller 12. Lighting control circuit 13 is specifically a dimming circuit such as a pulse width modulation (PWM) control circuit.

Light source 14 is a white light source for illumination that emits light using the voltage and current supplied from lighting control circuit 13. Specifically, light source 14 is realized by a fluorescent tube or a light-emitting diode (LED), for example. Light source 14 may be a semiconductor light-emitting element such as a semiconductor laser, or a solid-state light-emitting element such as an organic or inorganic electroluminescent (EL) element.

Storage 15 is a storage device that stores, for example, a control program executed by controller 12, a dimming parameter, and schedule information. Storage 15 also stores the MAC address of lighting fixture 10. The MAC address is an example of the identification information. Storage 15 is realized by a semiconductor memory, for example.

[Outline of Association Operation]

Figure 3:
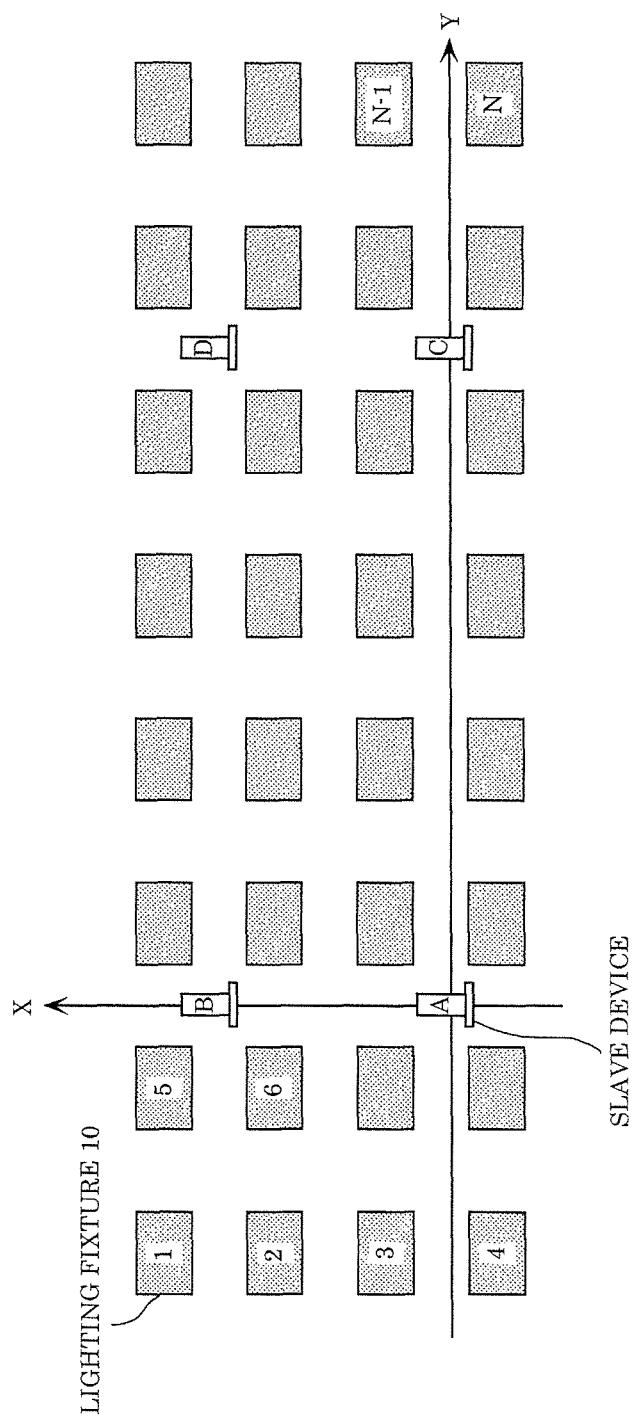
FIG. 3 illustrates arrangement of a plurality of lighting fixtures and a plurality of slave devices.

Next, the association operation of illumination system 100 will be described. In order to perform the association operation, storage 45 of information communication terminal 40 stores position information indicating arrangement of the plurality of lighting fixtures 10 and the plurality of slave devices A to D in a room in which illumination system 100 is installed. FIG. 3 illustrates arrangement of the plurality of lighting fixtures 10 and the plurality of slave devices A to D. FIG. 4 illustrates the position information stored in storage 45.

Note that the position information indicates the positions of a plurality of virtual lighting fixtures corresponding to the plurality of physical lighting fixtures 10, and also indicates the positions of a plurality of virtual slave devices corresponding to the plurality of physical slave devices A to D. Such virtual lighting fixtures are also referred to as lighting fixtures in the position information, and the virtual slave devices are referred to as slave devices in the position information. Furthermore, information for displaying an image showing a two-dimensional arrangement of the plurality of lighting fixtures 10 (in other words, the plurality of virtual lighting fixtures) and the plurality of slave devices A to D (in other words, the plurality of virtual slave devices) as illustrated in FIG. 3 is in some cases defined as the position information.

FIG. 3 is a top view of the room, and illustrates an example in which the plurality of lighting fixtures 10 are arranged in a matrix. The plurality of slave devices A to D are also arranged in a matrix.

Here, when installing illumination system 100, the installer etc. enter two-dimensional coordinates of the plurality of lighting fixtures 10 and the plurality of slave devices A to D with respect to the position of slave device A, by operating operation receiver 41, for example, in order for information communication terminal 40 to recognize the arrangement illustrated in FIG. 3. Second controller 42 calculates distances from each of the plurality of slave devices A to D to each of the plurality of lighting fixtures 10 based on the two-dimensional coordinates entered. As a result, the position information as illustrated in FIG. 4 is generated. In the position information, a temporary address (1, 2, 3, . . . N−1, N) is given to each of the positions of the plurality of lighting fixtures 10 in order to distinguish the plurality of lighting fixtures 10 from one another. Note that although temporary addresses are given to slave devices A to D as well, the MAC addresses of slave devices A to D are known. The MAC addresses of slave devices A to D are, for example, entered by the installer etc. via information communication terminal 40.

Note that such entering of the two-dimensional coordinates is performed via an entry screen displayed on display 44, for example. The entry screen may include an image showing the two-dimensional arrangement of the plurality of lighting fixtures 10 as illustrated in FIG. 3. The two-dimensional coordinates may be entered after the plurality of lighting fixtures 10 and the plurality of slave devices A to D are installed on the ceiling of the room, or, the two-dimensional coordinates may be entered first and then the plurality of lighting fixtures 10 and the plurality of slave devices A to D may be installed on the ceiling of the room according to the two-dimensional coordinates. The installer need not be concerned about the MAC addresses of the plurality of lighting fixtures 10, and only has to install the plurality of lighting fixtures 10 and the plurality of slave devices A to D in a manner consistent with the two-dimensional coordinates entered. Further, instead of the two-dimensional coordinates, the distances from each of the plurality of slave devices A to D to each of the plurality of lighting fixtures 10 may be entered directly.

Figure 5:
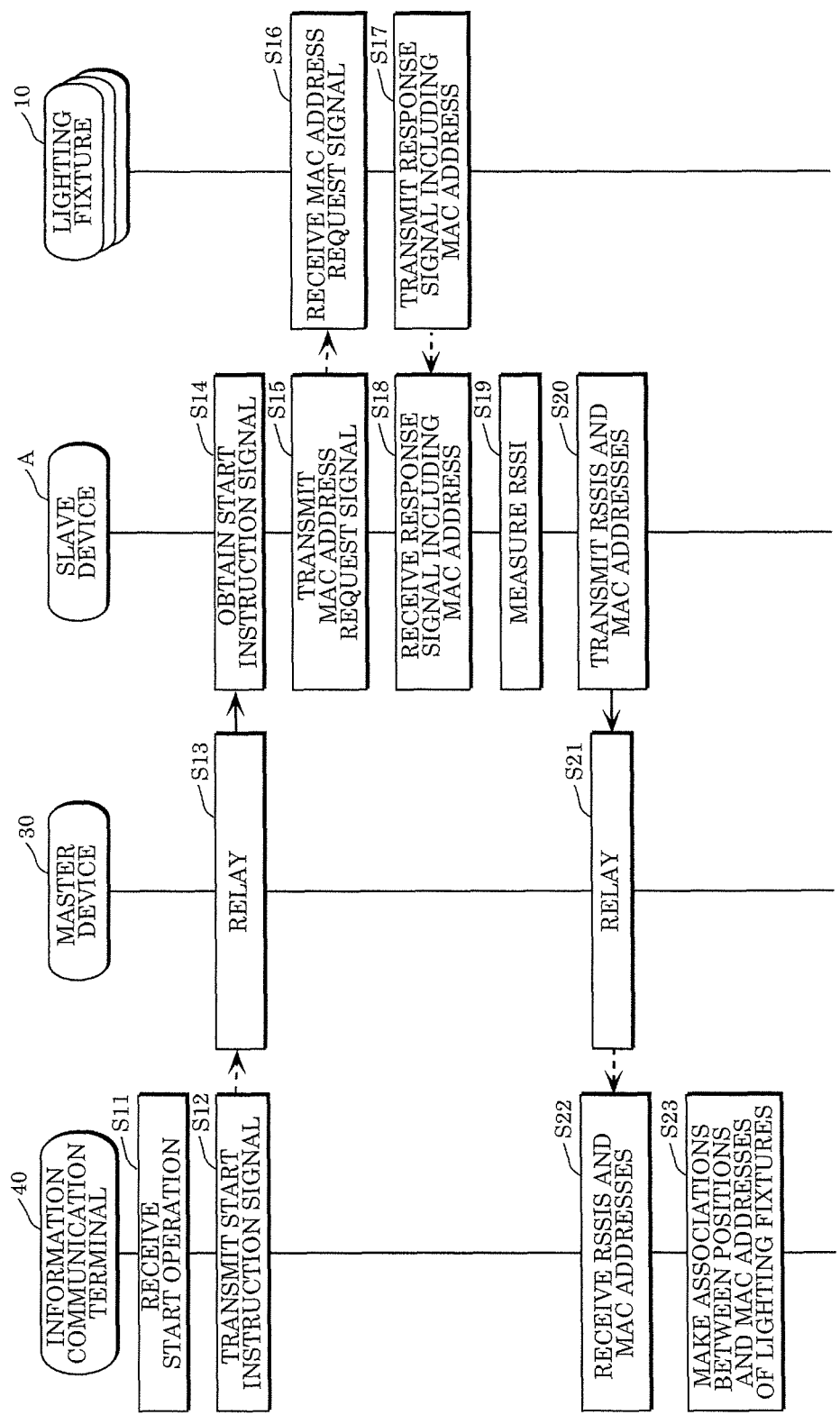
FIG. 5 illustrates a sequence of an association operation.

FIG. 5 illustrates a sequence of the association operation performed using such position information as described above. Although FIG. 5 shows slave device A only, there are actually four slave devices A to D. That is to say, each of slave devices A to D performs the same processing as slave device A.

First, operation receiver 41 of information communication terminal 40 receives a start operation that instructs to start the association operation (S11). For example, operation receiver 41 receives the start operation given by the installer.

Based on the start operation received by operation receiver 41, second controller 42 causes second wireless communication unit 43 to transmit a start instruction signal (S12). The start instruction signal is relayed by master device 30 (S13) and obtained by first controller 21 of slave device A (S14). Since the MAC addresses of the plurality of slave devices A to D are known as described above, second controller 42 can transmit the start instruction signal to slave device A.

Based on the start instruction signal obtained, first controller 21 causes first wireless communication unit 22 to broadcast a MAC address request signal (S15).

In each of the plurality of lighting fixtures 10, wireless communication unit 11 receives the MAC address request signal (S16). Then, controller 12 reads out the MAC address stored in storage 15 and causes wireless communication unit 11 to transmit a response signal including the MAC address read out (S17).

First wireless communication unit 22 of slave device A receives, from each of the plurality of lighting fixtures 10, a response signal including the MAC address of that lighting fixture 10 (S18). At this time, first wireless communication unit 22 receives the response signal, not only from target lighting fixture 10 to be controlled by slave device A, but from all the lighting fixtures included in illumination system 100.

Measurer 23 measures the RSSI of each response signal received by first wireless communication unit 22 from lighting fixtures 10 (S19). At this time, first controller 21 generates RSSI information indicating the RSSI measured, and stores, in storage 24, the MAC address of each lighting fixture 10 and the RSSI information of the response signal including the MAC address, in association with one another.

First controller 21 reads out, from storage 24, pairs of the MAC address and the RSSI information of the plurality of lighting fixtures 10, and causes the first wireless communication unit to transmit the pairs read out (S20). The MAC addresses and the RSSI information are relayed by master device 30 (S21). Note that although only slave device A is illustrated in FIG. 5, there are actually four slave devices A to D, and each of slave devices A to D transmits the RSSI information and the MAC address in the same manner as slave device A.

Figure 6:
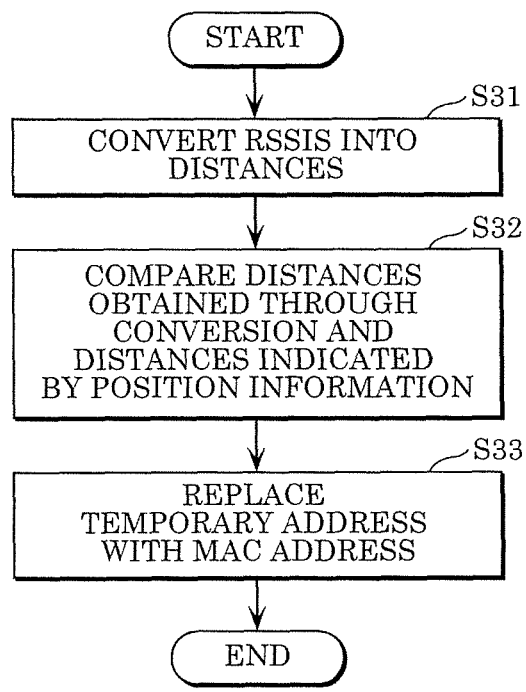
FIG. 6 is a flow chart illustrating the association processing more specifically.

The second wireless communication unit of information communication terminal 40 receives the RSSI information and the MAC addresses transmitted in Step S20 (S22). Based on the RSSI information and the position information, second controller 42 makes associations between the installation positions and the MAC addresses of the plurality of lighting fixtures 10 (S23). That is to say, second controller 42 associates each of the plurality of lighting fixtures in the position information with its MAC address. FIG. 6 is a flow chart illustrating the association processing in Step S23 more specifically.

First, second controller 42 converts the RSSIs indicated by the RSSI information received in Step S22 into distances (S31). Second controller 42, for example, converts an RSSI into distance d on the basis of the following Equation 1 which is based on the Friis transmission formula.

$$RSSI = TxPower - 20 \log(d) \qquad \text{(Equation 1)}$$

Note that TxPower in Equation 1 is the signal strength of the signal transmitted by wireless communication unit 11 of lighting fixture 10, and is, more specifically, the RSSI at a position one meter away from lighting fixture 10. Equation 1 is stored in storage 45 in advance.

In Step S31, the distances from each of the plurality of lighting fixtures 10 to each of the plurality of slave devices A to D are calculated. For each of the plurality of lighting fixtures 10, a set of distances (LA, LB, LC, LD) is calculated, where LA is the distance from that lighting fixture 10 to slave device A, LB is the distance from the same lighting fixture 10 to slave device B, LC is the distance from the same lighting fixture 10 to slave device C, and LD is the distance from the same lighting fixture 10 to slave device D.

Next, second controller 42 compares the distances calculated in Step S31 and the distances indicated by the position information stored in storage 45 (S32). Second controller 42, for example, compares the set of distances (LA, LB, LC, LD) with sets of distances (La, Lb, Lc, Ld) of a plurality of temporary addresses in the position information, so as to identify a temporary address associated with a set of distances (La, Lb, Lc, Ld) closest to the set of distances (LA, LB, LC, LD). For example, second controller 42 identifies a temporary address at which the square sum of residuals is the smallest, but may identify a temporary address using other matching techniques. If the number of slave devices is three or more, the accuracy of the temporary address identification can be enhanced.

Figure 7:
FIG. 7 illustrates position information in which temporary addresses have been replaced with MAC addresses.
Figure 8:
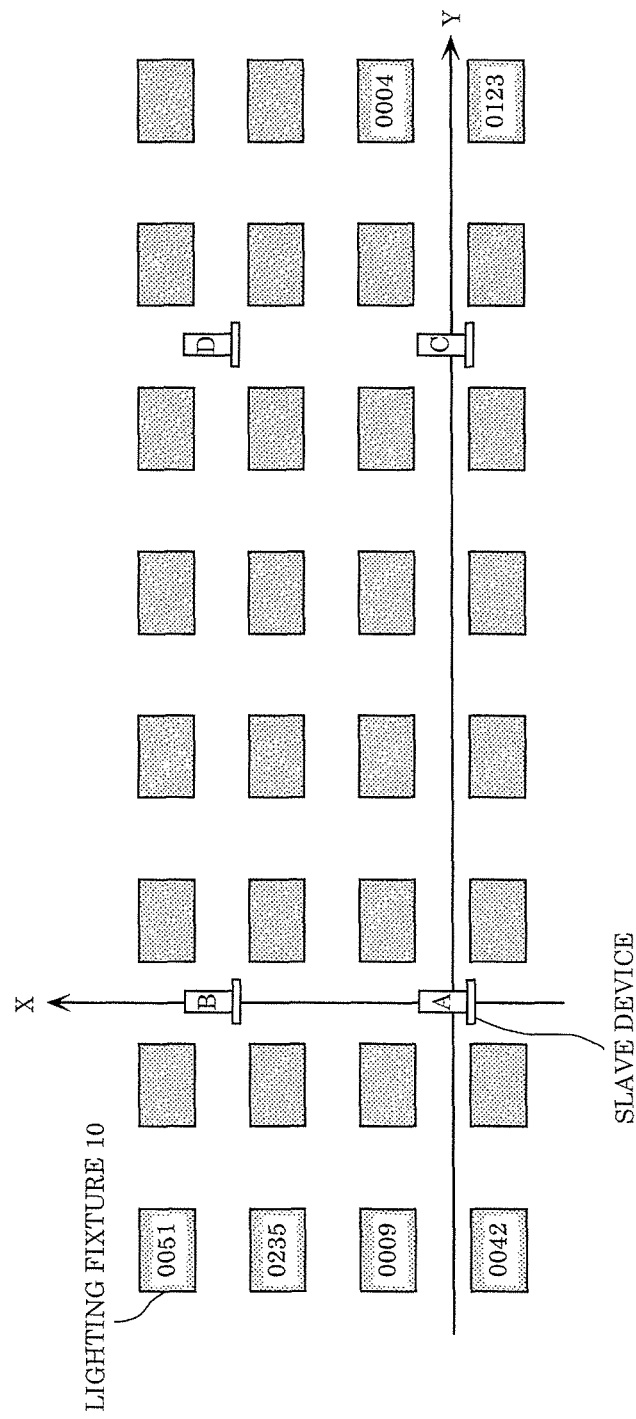
FIG. 8 illustrates arrangement of the plurality of lighting fixtures and the plurality of slave devices, which reflects the MAC addresses.

Next, second controller 42 replaces the identified temporary address with a MAC address (S33). FIG. 7 illustrates position information in which the temporary addresses have been replaced with MAC addresses. FIG. 8 illustrates arrangement of the plurality of lighting fixtures 10 and the plurality of slave devices A to D, which reflects the MAC addresses.

As illustrated in FIG. 7, for example, when the set of distances (LA, LB, LC, LD) of lighting fixture 10 having the MAC address "Xxxxxx0051" and the set of distances (La, Lb, Lc, Ld) of the temporary address "1" are closest to each other, second controller 42 replaces the temporary address "1" with the MAC address "Xxxxxx0051". As a result of such processing, the positions and the MAC addresses of the plurality of lighting fixtures 10 are associated with one another as illustrated in FIG. 7 and FIG. 8.

In the manner as described above, second controller 42 identifies, based on the RSSI information and the position information indicating a positional relationship between the plurality of lighting fixtures 10 and the plurality of slave devices A to D, the position of a first lighting fixture among the plurality of lighting fixtures 10 which has a corresponding positional relationship to a given slave device among the plurality of slave device A to D. Further, second controller 42 associates the installation position of the first lighting fixture with identification information of the first lighting fixture. That is to say, second controller 42 identifies, in the position information, a lighting fixture corresponding to the first lighting fixture, and associates the lighting fixture identified in the position information with the identification information of the first lighting fixture. Illumination system 100 can automatically make associations between the positions and the MAC addresses of the plurality of lighting fixtures 10. Since the installer is not required to enter the MAC addresses, the time required for installing illumination system 100 is reduced.

Note that second controller 42 may cause display 44 to display an image as illustrated in FIG. 8. In FIG. 8, the last four digits of the MAC addresses are shown at the respective positions of the lighting fixtures. This allows the installer to easily recognize the correspondence relationship between the positions and the MAC addresses of the plurality of lighting fixtures 10.

[Variation]

Figure 9:
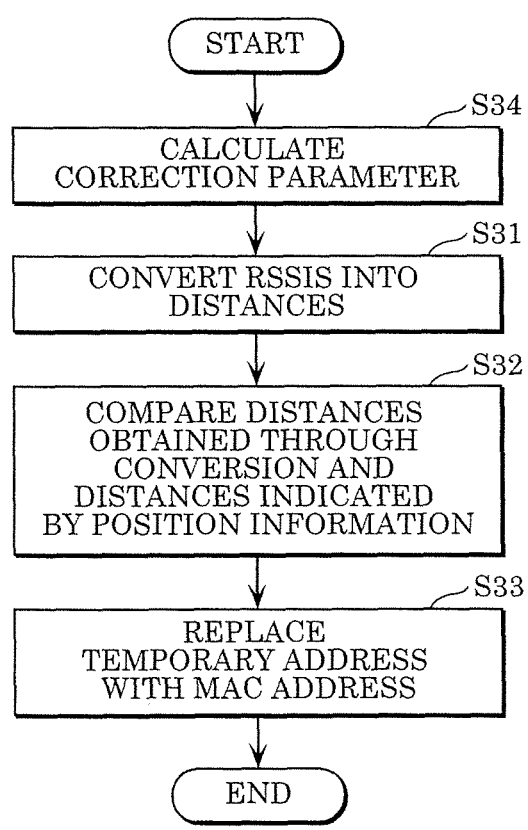
FIG. 9 is a flowchart of association processing according to a variation of Embodiment 1.

As described above, although the RSSI is converted into a distance based on Equation 1 shown above, Equation 1 may be corrected based on a correction parameter obtained by actually measuring in advance the RSSI between two devices the distance between which is known. FIG. 9 is a flowchart of association processing according to such a variation.

Second controller 42 calculates a correction parameter based on the RSSI between two devices the distance between which is known (S34). Specifically, second controller 42 calculates a correction parameter based on a difference between the known, actual distance and a distance calculated based on the RSSI and Equation 1 above. The correction parameter may be a coefficient by which at least one term in Equation 1 is multiplied, or an offset added to at least one term in Equation 1, or both.

That the distance between two devices is known means that the MAC addresses of the two devices are known in the position information. The distance between the two devices is included in the position information as a result of, for example, the installer entering the MAC addresses of the two devices by operating operation receiver 41.

The two devices the distance between which is known are, for example, a target slave device among the plurality of slave devices and a target lighting fixture among the plurality of lighting fixtures 10. In other words, the target lighting fixture is a second lighting fixture. In this case, second wireless communication unit 43 receives, from the target slave device via master device 30, target RSSI information indicating the RSSI of a signal received by the target slave device from the target lighting fixture. Second controller 42 calculates the correction parameter based on the target RSSI information and the distance from the target slave device to the target lighting fixture indicated by the position information.

Further, the two devices the distance between which is known may be, for example, two slave devices among the plurality of slave devices. In this case, second wireless communication unit 43 receives, from one of the two slave devices, target RSSI information indicating the RSSI of a signal received by the one slave device from the other slave device. Second controller 42 calculates the correction parameter based on the target RSSI information and the distance between the two slave devices indicated by the position information.

Next, second controller 42 converts the RSSI indicated by the RSSI information into a distance (S31). At this time, second controller 42 corrects Equation 1 using the correction parameter calculated in Step S34, and uses corrected Equation 1. That is to say, second controller 42 converts the RSSI indicated by the RSSI information into a distance using the correction parameter calculated. Subsequent processing is the same as Step S32 and Step S33 illustrated in FIG. 6.

As described above, use of the correction parameter makes it possible to enhance the calculation accuracy of the distance obtained by the RSSI conversion.

[Advantageous Effects, Etc.]

As described above, illumination system 100 includes a plurality of lighting fixtures 10, a plurality of slave devices A to D, and information communication terminal 40. The plurality of slave devices A to D are an example of the plurality of illumination controllers. Each of the plurality of slave devices A to D includes: first wireless communication unit 22 configured to receive, from each of the plurality of lighting fixtures 10, a signal including a MAC address of that lighting fixture 10, and to measure a received signal strength indication (RSSI) of the signal received; and first controller 21 that causes first wireless communication unit 22 to transmit the MAC address and RSSI information indicating the RSSI measured by first wireless communication unit 22. The MAC address is an example of the identification information. Information communication terminal 40 includes: second wireless communication unit 43 configured to receive the RSSI information and the MAC address, transmitted from each of the plurality of slave devices A to D; and second controller 42 that (i) based on the RSSI information and position information indicating a positional relationship between the plurality of lighting fixtures 10 and the plurality of slave devices A to D, identifies lighting fixture 10 in the position information, which corresponds to a first lighting fixture among the plurality of lighting fixtures 10, which has a corresponding positional relationship to a given slave device among plurality of slave devices A to D and (ii) associates the lighting fixture identified in the position information with the MAC address of the first lighting fixture.

Such illumination system 100 can easily make associations between the positions and the MAC addresses of the plurality of lighting fixtures 10. Since the installer is not required to enter the MAC addresses, the time required for installing illumination system 100 is reduced.

Further, for example, second controller 42 converts the RSSI indicated by the RSSI information into a distance, and associates the lighting fixture identified in the position information with the MAC address of the first lighting fixture based on the distance and the position information.

By converting the RSSIs into distances, illumination system 100 having such a configuration as above can easily make associations between the positions and the MAC addresses of the plurality of lighting fixtures 10.

In addition, for example, information communication terminal 40 further includes storage 45 configured to store the position information.

Illumination system 100 having such a configuration as above can easily make associations between the positions and the MAC addresses of the plurality of lighting fixtures 10 based on the position information stored in storage 45.

For example, the position information indicates distances between each of the plurality of lighting fixtures 10 and each of the plurality of slave devices A to D, and second controller 42 converts the RSSI indicated by the RSSI information into a distance and associates the lighting fixture identified in the position information with the MAC address of the first lighting fixture by comparing the distance with the distances indicated by the position information.

By comparing the distance obtained through the RSSI conversion and the distances indicated by the position information, illumination system 100 having such a configuration as above can make associations between the positions and the MAC addresses of the plurality of lighting fixtures 10.

For example, second controller 42: calculates a correction parameter based on (i) target RSSI information indicating an RSSI of a signal received by a target slave device among the plurality of slave devices A to D from a second lighting fixture among the plurality of lighting fixtures 10 and (ii) a distance from the target slave device to the second lighting fixture, indicated by the position information; and converts the RSSI indicated by the RSSI information into a distance using the correction parameter calculated.

This makes it possible to enhance the calculation accuracy in the RSSI-to-distance conversion.

For example, second controller 42: calculates a correction parameter based on (i) target RSSI information indicating an RSSI of a signal received by one of two slave devices among the plurality of slave devices A to D from the other of the two slave devices and (ii) a distance between the two slave devices that is indicated by the position information; and converts the RSSI indicated by the RSSI information into a distance using the correction parameter calculated.

This makes it possible to enhance the calculation accuracy of the distance obtained by the RSSI conversion.

For example, a temporary address is given to each of a plurality of lighting fixtures in the position information, and second controller 42 associates the lighting fixture identified in the position information with the MAC address of the first lighting fixture by replacing the temporary address given to the first lighting fixture with the MAC address based on the RSSI information and the position information. The temporary address is an example of the temporary identification information.

By replacing the temporary addresses with the MAC addresses, illumination system 100 having such a configuration as above can easily make associations between the positions and the MAC addresses of the plurality of lighting fixtures 10.

For example, first controller 21 further causes first wireless communication unit 22 to transmit a command for performing lighting control on at least a portion of the plurality of lighting fixtures 10.

With this, first wireless communication unit 22 that performs communication regarding commands to target lighting fixture 10 to be controlled can further perform communication regarding the association operation, thereby inhibiting addition of structural elements. Accordingly, it is possible to reduce the component cost etc. of illumination system 100.

Further, an illumination setting method for use in illumination system 100 including a plurality of lighting fixtures 10, a plurality of slave devices A to D, and information communication terminal 40 is an illumination setting method including: by each of the plurality of slave devices A to D, receiving, from each of the plurality of lighting fixtures 10, a signal including a MAC address of that lighting fixture 10, and measuring a received signal strength indication (RSSI) of the signal received from each of the plurality of lighting fixtures 10; and transmitting the MAC address and RSSI information indicating the RSSI measured. The illumination setting method further includes: by information communication terminal 40, receiving the RSSI information and the MAC address, transmitted from each of the plurality of slave devices A to D; based on the RSSI information and position information indicating a positional relationship between the plurality of lighting fixtures 10 and the plurality of slave devices A to D, identifying lighting fixture 10 in the position information, which corresponds to a first lighting fixture among the plurality of lighting fixtures 10, which has a corresponding positional relationship to a given illumination controller among the plurality of illumination controllers; and associating the lighting fixture identified in the position information with the MAC address of the first lighting fixture.

Such an illumination setting method as described above can easily make associations between the positions and the MAC addresses of the plurality of lighting fixtures 10.

Furthermore, in a program that causes information communication terminal 40 of illumination system 100 including a plurality of lighting fixtures 10, a plurality of slave devices A to D, and information communication terminal 40 to execute an illumination setting method, the illumination setting method includes: based on RSSI information and position information indicating a positional relationship between the plurality of lighting fixtures 10 and the plurality of slave devices A to D, identifying a lighting fixture in the position information, which corresponds to a first lighting fixture among the plurality of lighting fixtures 10, which has a corresponding positional relationship to a given slave device among the plurality of slave devices A to D; and associating the lighting fixture identified in the position information with the MAC address of the first lighting fixture.

Such a program as described above can easily make associations between the positions and the MAC addresses of the plurality of lighting fixtures 10.

Embodiment 2

Figure 10:
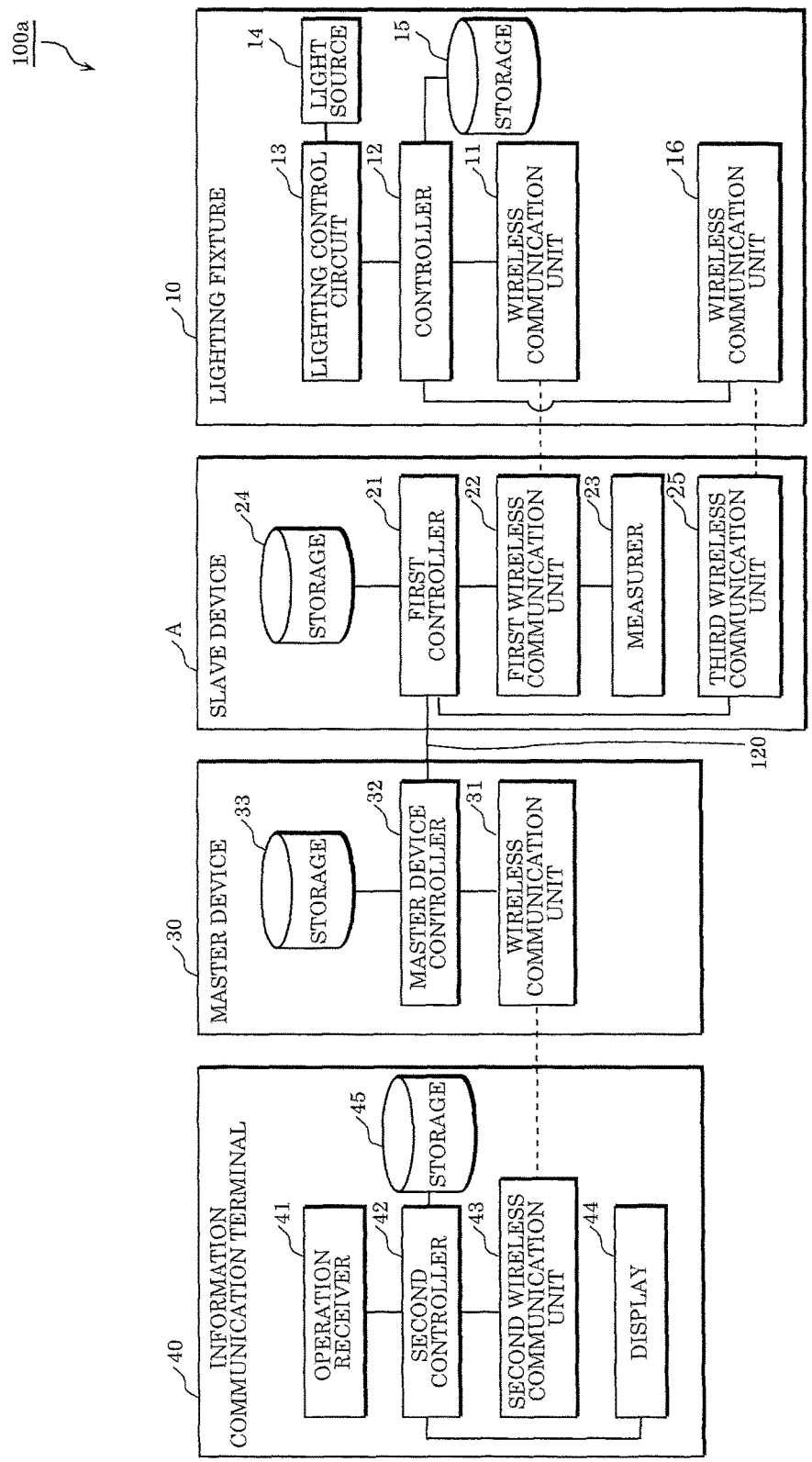
FIG. 10 is a block diagram illustrating a functional configuration of an illumination system according to Embodiment 2.

In Embodiment 1 described above, first wireless communication unit 22 performs both reception of the signal for measuring the RSSI and transmission of a command to lighting fixtures 10; however, the transmission of a command to lighting fixtures 10 may be performed by another wireless communication unit different from first wireless communication unit 22. FIG. 10 is a block diagram illustrating a functional configuration of such an illumination system according to Embodiment 2. Although FIG. 10 shows only one slave device and one lighting fixture 10, there are actually a plurality of slave devices A to D and a plurality of lighting fixtures 10.

In illumination system 100a illustrated in FIG. 10, slave device A includes third wireless communication unit 25 different from first wireless communication unit 22. Although not illustrated, slave devices B to D also include third wireless communication unit 25.

Third wireless communication unit 25 is a wireless communication circuit that allows slave device A to wirelessly communicate with the plurality of lighting fixtures 10. Third wireless communication unit 25 is different from first wireless communication unit 22 in at least one of the wireless communication scheme (communication standard) and the frequency band of radio waves used for wireless communication. For example, based on control by first controller 21, third wireless communication unit 25 transmits a command for performing lighting control to target lighting fixture 10. In other words, first controller 21 causes third wireless communication unit 25 to transmit a command for performing lighting control on at least a portion of the plurality of lighting fixtures 10. In Embodiment 2, first wireless communication unit 22 does not transmit the command to target lighting fixture 10, and is used only for communication regarding the association operation, such as reception of the signal for measuring the RSSI.

Further, in illumination system 100a, each of the plurality of lighting fixtures 10 includes wireless communication unit 16 different from wireless communication unit 11.

Wireless communication unit 16 is a wireless communication circuit that allows lighting fixture 10 to wirelessly communicate with slave device A. Wireless communication unit 16 is different from wireless communication unit 11 in at least one of the wireless communication scheme and the frequency band of radio waves used for wireless communication. Wireless communication unit 16, for example, receives the command for performing lighting control from slave device A. In Embodiment 2, wireless communication unit 11 does not receive the command for performing lighting control from slave device A, and is used only for communication regarding the association operation, such as transmission of the signal for measuring the RSSI.

As described above, in illumination system 100a, each of the plurality of slave devices A to D includes third wireless communication unit 25 different from first wireless communication unit 22 and second wireless communication unit 43, and first controller 21 further causes third wireless communication unit 25 to transmit a command for performing lighting control on at least a portion of the plurality of lighting fixtures 10.

With this, each of slave devices A to D can measure the RSSI via first wireless communication unit 22 different from third wireless communication unit 25 used for transmitting a command to lighting fixture 10.

Note that when, as in Embodiment 2, first wireless communication unit 22 and wireless communication unit 11 are treated as additional structural elements for distance measurement, wireless communication unit 11 may be a beacon transmitter that regularly transmits a MAC address and first wireless communication unit 22 may be a beacon receiver.

Furthermore, in Embodiment 2, each of the plurality of slave devices A to D and each of the plurality of lighting fixtures 10 may include a global positioning system (GPS) module as an additional structural element for distance measurement. In this case, each of the plurality of slave devices A to D and each of the plurality of lighting fixtures 10 may transmit GPS coordinate information to information communication terminal 40, and information communication terminal 40 may calculate distances from each of the plurality of slave devices A to D to each of the plurality of lighting fixtures 10 based on the GPS coordinate information.

Furthermore, in Embodiment 2, each of the plurality of slave devices A to D and each of the plurality of lighting fixtures 10 may include third wireless communication unit 25 or wireless communication unit 11 conforming to Wi-Fi (registered trademark), and may calculate distances using micro-location technologies such as Wi-Fi (registered trademark) location engine, Wi-Fi (registered trademark) Sniffer, or Wi-Fi (registered trademark)-based real time location system (RTLS).

Embodiment 3

Figure 11:
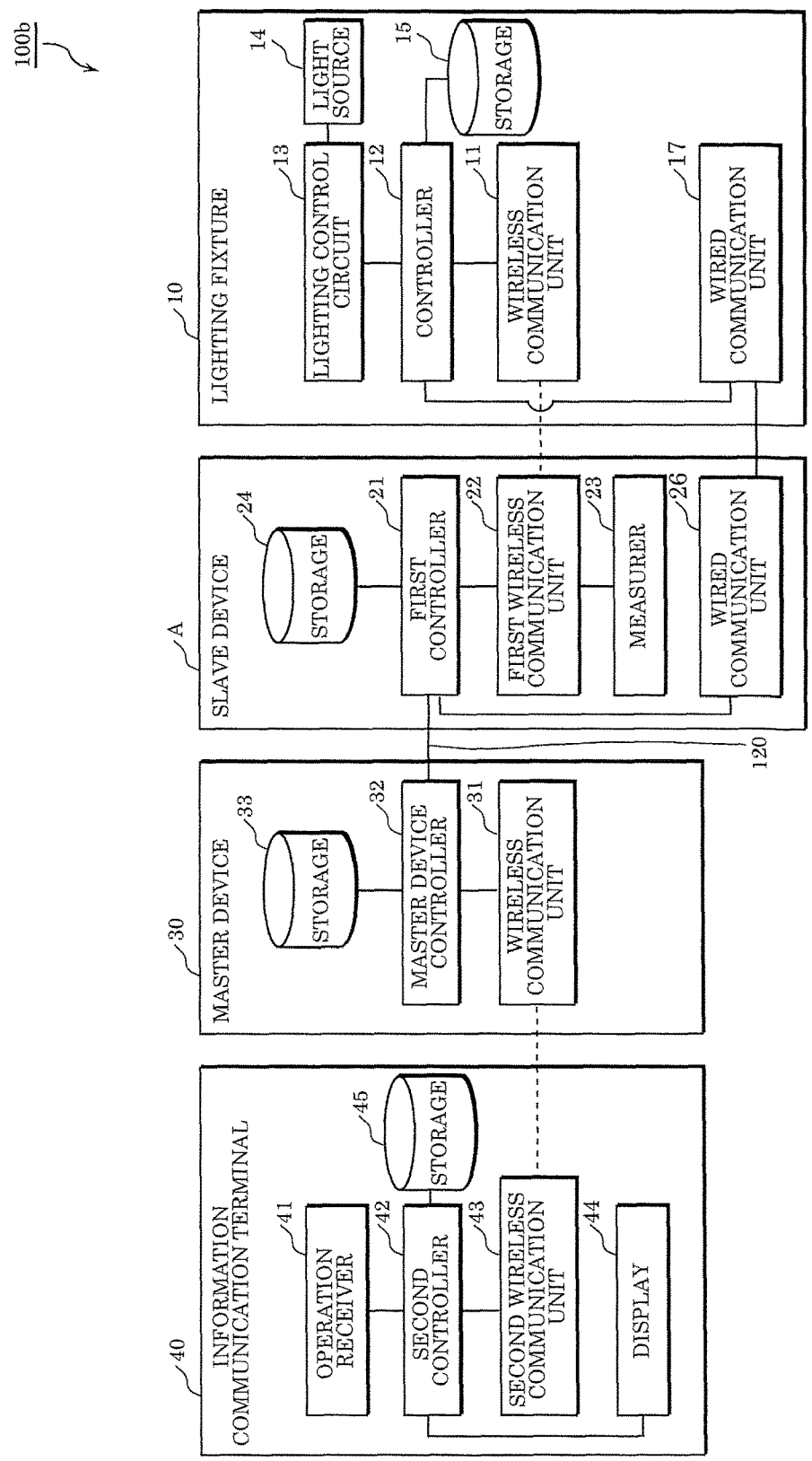
FIG. 11 is a block diagram illustrating a functional configuration of an illumination system according to Embodiment 3.

The transmission of a command to lighting fixture 10 may be performed by a wired communication unit. FIG. 11 is a block diagram illustrating a functional configuration of such an illumination system according to Embodiment 3. Although FIG. 11 shows only one slave device and one lighting fixture 10, there are actually a plurality of slave devices A to D and a plurality of lighting fixtures 10.

In illumination system 100b illustrated in FIG. 11, slave device A includes wired communication unit 26. Although not illustrated, slave devices B to D also include wired communication unit 26.

Wired communication unit 26 is a wired communication circuit that allows slave device A to perform wired communication with the plurality of lighting fixtures 10. For example, based on control by first controller 21, wired communication unit 26 transmits a command for performing lighting control to target lighting fixture 10. In other words, first controller 21 causes wired communication unit 26 to transmit a command for performing lighting control on at least a portion of the plurality of lighting fixtures 10. In Embodiment 3, first wireless communication unit 22 does not transmit the command to target lighting fixture 10, and is used only for communication regarding the association operation, such as reception of the signal for measuring the RSSI.

Further, in illumination system 100b, each of the plurality of lighting fixtures 10 includes wired communication unit 17.

Wired communication unit 17 is a wired communication circuit that allows lighting fixture 10 to perform wired communication with slave device A. For example, wired communication unit 17 receives a command for performing lighting control from slave device A. In Embodiment 3, wireless communication unit 11 does not receive the command for performing lighting control from slave device A, and is used only for communication regarding the association operation, such as transmission of the signal for measuring the RSSI.

As described above, in illumination system 100b, each of the plurality of slave devices A to D includes wired communication unit 26, and first controller 21 further causes wired communication unit 26 to transmit a command for performing lighting control on at least a portion of the plurality of lighting fixtures 10.

With this, each of slave devices A to D can measure the RSSI via first wireless communication unit 22 different from wired communication unit 26 used for transmitting a command to lighting fixture 10. For example, according to illumination system 100b, first wireless communication unit 22 and wireless communication unit 11 are used as structural elements dedicated to the distance measurement (more specifically, the RSSI measurement), and wired communication unit 26 and wired communication unit 17 are used for the command transmission from slave device A to lighting fixture 10.

Other Embodiments

Although some embodiments have been described above, the present disclosure is not limited to the above embodiments.

For example, in the above embodiments, the identification information has been exemplified as MAC addresses, but the identification information is not limited to MAC addresses as long as the lighting fixtures can be uniquely identified.

Further, according to the above embodiments, the position information indicates the distances between each of the plurality of lighting fixtures and each of the plurality of slave devices, but the position information only needs to indicate a positional relationship between the plurality of lighting fixtures and the plurality of slave devices. The position information only needs to directly or indirectly indicate the distances between each of the plurality of lighting fixtures and each of the plurality of slave devices.

Further, in the above embodiments, the RSSI of the signal including the identification information (specifically, the response signal) is measured, but the RSSI of a signal other than the signal including the identification information may be measured.

Furthermore, the methods for communication between devices described in the above embodiments are mere examples. The methods for communication between devices are not particularly limited. For example, the wireless communication performed between devices uses a communication standard such as specified low power radio, ZigBee (registered trademark), Bluetooth (registered trademark), or Wi-Fi (registered trademark). Note that the wireless communication is specifically radio communication or infrared communication, for example. In addition, the communication standard of the wireless communication performed between the information communication terminal and the master device may be the same as or different from the communication standard of the wireless communication performed between the slave devices and the lighting fixtures.

In the above embodiments, a process performed by a particular processing unit may be performed by another processing unit. Further, the order in which a plurality of processes are performed may be changed, or a plurality of processes may be performed in parallel.

In the above embodiments, the structural elements such as the controller may be realized by executing a software program suitable for each structural element. Each structural element may be realized by means of a program executing unit, such as a CPU or a processor, reading and executing a software program recorded on a recording medium such as a hard disk or a semiconductor memory.

Furthermore, the structural elements such as the controller may be realized by a hardware product. For example, the structural elements such as the controller may be circuits (or integrated circuits). These circuits may constitute a single circuit as a whole or may be individual circuits. Furthermore, each of these circuits may be a general purpose circuit or may be a dedicated circuit.

Note that the general or specific aspects of the present disclosure may be realized by a system, a device, a method, an integrated circuit, a computer program, or a computer-readable recording medium such as a CD-ROM. The general or specific aspects of the present disclosure may also be realized by any combination of a system, a device, a method, an integrated circuit, a computer program, and a recording medium. For example, the present disclosure may be realized as a program for causing an information communication terminal to perform the illumination setting method, or may be realized as a non-transitory recording medium on which such a program is recorded.

The present disclosure also encompasses: embodiments achieved by applying various modifications conceivable to those skilled in the art to each embodiment; and embodiments achieved by arbitrarily combining the structural elements and the functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination system, comprising:
a plurality of lighting fixtures;
a plurality of illumination controllers; and
an information communication terminal, wherein
each of the plurality of illumination controllers includes:
first wireless communication circuitry configured to receive, from each of the plurality of lighting fixtures, a signal including identification information of the lighting fixture, and to measure a received signal strength indication (RSSI) of the signal received; and
a first controller that causes the first wireless communication circuitry to transmit the identification information and RSSI information indicating the RSSI measured by the first wireless communication circuitry, and
the information communication terminal includes:
second wireless communication circuitry configured to receive the RSSI information and the identification information, transmitted from each of the plurality of illumination controllers; and a second controller that (i) based on the RSSI information and position information indicating a positional relationship between the plurality of lighting fixtures and the plurality of illumination controllers, identifies a lighting fixture in the position information, which corresponds to a first lighting fixture among the plurality of lighting fixtures, which has a corresponding positional relationship to a given illumination controller among the plurality of illumination controllers, and (ii) associates the lighting fixture identified in the position information with the identification information of the first lighting fixture.

2. The illumination system according to claim 1, wherein the second controller converts the RSSI indicated by the RSSI information into a distance, and associates the lighting fixture identified in the position information with the identification information of the first lighting fixture based on the distance and the position information.

3. The illumination system according to claim 1, wherein the information communication terminal further includes a storage configured to store the position information.

4. The illumination system according to claim 2, wherein the position information indicates distances between each of the plurality of lighting fixtures and each of the plurality of illumination controllers, and
the second controller converts the RSSI indicated by the RSSI information into a distance, and associates the lighting fixture identified in the position information with the identification information of the first lighting fixture by comparing the distance with the distances indicated by the position information.

5. The illumination system according to claim 2, wherein the second controller:
calculates a correction parameter based on (i) target RSSI information indicating an RSSI of a signal received by a target illumination controller among the plurality of illumination controllers from a second lighting fixture among the plurality of lighting fixtures and (ii) a distance from the target illumination controller to the second lighting fixture, indicated by the position information; and
converts the RSSI indicated by the RSSI information into a distance using the correction parameter calculated.

6. The illumination system according to claim 2, wherein the second controller:
calculates a correction parameter based on (i) target RSSI information indicating an RSSI of a signal received by one of two illumination controllers among the plurality of illumination controllers from another of the two illumination controllers and (ii) a distance between the two illumination controllers that is indicated by the position information; and
converts the RSSI indicated by the RSSI information into a distance using the correction parameter calculated.

7. The illumination system according to claim 1, wherein temporary identification information is given to each of a plurality of lighting fixtures in the position information, and
the second controller associates the lighting fixture identified in the position information with the identification information of the first lighting fixture by replacing the temporary identification information given to the first lighting fixture with the identification information based on the RSSI information and the position information.

8. The illumination system according to claim 1, wherein the first controller further causes the first wireless communication circuitry to transmit a command for performing lighting control on at least a portion of the plurality of lighting fixtures.

9. The illumination system according to claim 1, wherein each of the plurality of illumination controllers includes third wireless communication circuitry different from the first wireless communication circuitry and the second wireless communication circuitry, and
the first controller further causes the third wireless communication circuitry to transmit a command for performing lighting control on at least a portion of the plurality of lighting fixtures.

10. The illumination system according to claim 1, wherein each of the plurality of illumination controllers includes wired communication circuitry, and
the first controller further causes the wired communication circuitry to transmit a command for performing lighting control on at least a portion of the plurality of lighting fixtures.

11. An illumination setting method for use in an illumination system including a plurality of lighting fixtures, a plurality of illumination controllers, and an information communication terminal, the illumination setting method comprising:
by each of the plurality of illumination controllers,
receiving, from each of the plurality of lighting fixtures, a signal including identification information of the lighting fixture, and measuring a received signal strength indication (RSSI) of the signal received from each of the plurality of lighting fixtures;
transmitting the identification information and RSSI information indicating the RSSI measured;
by the information communication terminal,
receiving the RSSI information and the identification information, transmitted from each of the plurality of illumination controllers;
based on the RSSI information and position information indicating a positional relationship between the plurality of lighting fixtures and the plurality of illumination controllers, identifying a lighting fixture in the position information, which corresponds to a first lighting fixture among the plurality of lighting fixtures, which has a corresponding positional relationship to a given illumination controller among the plurality of illumination controllers; and
associating the lighting fixture identified in the position information with the identification information of the first lighting fixture.

12. The illumination setting method according to claim 11, wherein
in the associating, the RSSI indicated by the RSSI information is converted into a distance, and the lighting fixture identified in the position information is associated with the identification information of the first lighting fixture based on the distance and the position information.

13. The illumination setting method according to claim 12, wherein
the position information indicates distances between each of the plurality of lighting fixtures and each of the plurality of illumination controllers, and
in the associating included in the illumination setting method, the RSSI indicated by the RSSI information is converted into a distance, and the lighting fixture identified in the position information is associated with the identification information of the first lighting fixture by comparing the distance with the distances indicated by the position information.

14. A non-transitory computer-readable recording medium for use in an information communication terminal included in an illumination system including a plurality of lighting fixtures, a plurality of illumination controllers, and the information communication terminal, the recording medium having a program recorded thereon for causing the information communication terminal to execute an illumination setting method, wherein each of the plurality of illumination controllers:
receives, from each of the plurality of lighting fixtures, a signal including identification information of the lighting fixture, and measures a received signal strength indication (RSSI) of the signal received from each of the plurality of lighting fixtures; and
transmits the identification information and RSSI information indicating the RSSI measured, and the illumination setting method includes:
receiving the RSSI information and the identification information, transmitted from each of the plurality of illumination controllers;
based on the RSSI information and position information indicating a positional relationship between the plurality of lighting fixtures and the plurality of illumination controllers, identifying a lighting fixture in the position information, which corresponds to a first lighting fixture among the plurality of lighting fixtures, which has a corresponding positional relationship to a given illumination controller among the plurality of illumination controllers; and
associating the lighting fixture identified in the position information with the identification information of the first lighting fixture.

15. The recording medium according to claim 14, wherein in the associating included in the illumination setting method, the RSSI indicated by the RSSI information is converted into a distance, and the lighting fixture identified in the position information is associated with the identification information of the first lighting fixture based on the distance and the position information.

16. The recording medium according to claim 15, wherein the position information indicates distances between each of the plurality of lighting fixtures and each of the plurality of illumination controllers, and
in the associating included in the illumination setting method, the RSSI indicated by the RSSI information is converted into a distance, and the lighting fixture identified in the position information is associated with the identification information of the first lighting fixture by comparing the distance with the distances indicated by the position information.

17. An illumination system, comprising:
a plurality of lighting fixtures;
a plurality of illumination controllers; and
an information communication terminal, wherein
each of the plurality of illumination controllers includes:
first wireless communication circuitry configured to receive, from each of the plurality of lighting fixtures, a signal including identification information of the lighting fixture, and to measure a received signal strength indication (RSSI) of the signal received; and
a first controller that causes the first wireless communication circuitry to transmit the identification information and RSSI information indicating the RSSI measured by the first wireless communication circuitry, and the information communication terminal includes:
second wireless communication circuitry configured to receive the RSSI information and the identification information, transmitted from each of the plurality of illumination controllers;
a storage that stores position information indicating a positional relationship between the plurality of lighting fixtures and the plurality of illumination controllers; and
a second controller that identifies a lighting fixture in the position information, which corresponds to a lighting fixture having a corresponding positional relationship to a given illumination controller among the plurality of illumination controllers, and associates, in the position information, the identified lighting fixture with the identification information of the first lighting fixture.

* * * * *